(12) United States Patent
Jaeger (10) Patent No.: US 6,950,089 B1
(45) Date of Patent: *Sep. 27, 2005

(54) MOVEABLE MAGNETIC DEVICES FOR ELECTRONIC GRAPHIC DISPLAYS

(75) Inventor: Denny Jaeger, Oakland, CA (US)

(73) Assignee: NBOR Corporation, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/377,934

(22) Filed: Feb. 28, 2003

Related U.S. Application Data (60) Division of application No. 09/721,364, filed on Nov. 22, 2000, now Pat. No. 6,606,081, which is a continuation-in-part of application No. 09/670,610, filed on Sep. 26, 2000.

(51) Int. Cl.[7] .............................................. G09G 3/00

(52) U.S. Cl. ...................... 345/111; 345/110; 345/109; 345/108; 349/59

(58) Field of Search ........................ 345/111, 172, 168, 345/173, 184, 108, 678, 110, 109, 156, 162, 345/169; 455/179.1; 715/764, 738; 348/595, 348/594

(56) References Cited

U.S. PATENT DOCUMENTS

| | | | |
|---|---|---|---|
| 4,597,209 A * | 7/1986 | Hukill | 40/447 |
| 6,278,431 B1 * | 8/2001 | Kao | 345/111 |
| 6,360,464 B1 * | 3/2002 | Tate | 40/621 |
| 6,405,465 B2 * | 6/2002 | Dwyer et al. | 40/594 |
| 6,603,458 B1 * | 8/2003 | Fischer et al. | 345/111 |
| 6,606,081 B1 * | 8/2003 | Jaeger et al. | 345/111 |
| 6,626,303 B1 * | 9/2003 | Moodie | 211/70.7 |
| 6,647,652 B1 * | 11/2003 | Seiber et al. | 40/615 |

\* cited by examiner

*Primary Examiner*—Xiao Wu
*Assistant Examiner*—Abbas I Abdulselam
(74) *Attorney, Agent, or Firm*—Harris Zimmerman (57) ABSTRACT

In one aspect, the invention includes a fader controller comprised of a longitudinally extending track having a portion thereof extending over an image area of an electronic display, and a fader cap joined to the track for longitudinal sliding translation therealong. A plurality of permanent magnets are spaced along the track, and the fader cap includes at least one electromagnet. Conductive rails extend longitudinally on the track, and the fader cap includes contacts that electrically engage the conductive rails. The electromagnets are actuated to translate the fader cap distally or proximally along the track. In another aspect, the invention provides a magnetic arrangement for removably joining one or more controller device to a flat panel electronic display, whereby controllers such as switches, knobs, and faders (slide controllers) may be superposed on the display.

18 Claims, 10 Drawing Sheets

MOVEABLE MAGNETIC DEVICES FOR ELECTRONIC GRAPHIC DISPLAYS

CROSS-REFERENCE TO RELATED APPLICATIONS

This application is a divisional of application Ser. No. 09/721,364, filed Nov. 22, 2000 now U.S. Pat. No. 6,606,081, which is a continuation-in-part of application Ser. No. 09/670,610, filed Sep. 26, 2000, for which priority is claimed.

FEDERALLY SPONSORED RESEARCH

Not applicable.

SEQUENCE LISTING, ETC ON CD

Not applicable.

BACKGROUND OF THE INVENTION

1. Field of the Invention

This invention relates to computer input devices and, more particularly, to mechanical controller devices that may be combined with computer graphic displays and/or touch screen input devices.

2. Description of Related Art

Touch screen devices have become a commonplace user interface for electronic devices, computers, and the like. Touch screens are typically combined with a display screen which is in close proximity to the touch screen or which projects images through the touch screen. Under software control, the display may present images, video, alphanumeric information, and various combinations thereof. Moreover, the display may define corresponding areas of the touch screen as control input areas, through the presentation of control command words, iconic or graphic representations of controls, or the like. Thereafter, an operator touch at an appropriate portion of the touch screen causes the software to correlate the touch position with the control command defined by the display at that position, and to act on that command.

It is well known in the prior art to employ controller devices in conjunction with touch screen devices and computer displays to emulate the sensation and feel of mechanical input devices, such as knobs, joysticks, and sliding (fader) controls. Such touch screen controller devices are described, for example, in the following U.S. patents issued to the present inventors:

U.S. Pat. No. 5,572,239
U.S. Pat. No. 5,977,955
U.S. Pat. No. 5,805,146
U.S. Pat. No. 5,805,145
U.S. Pat. No. 5,936,613
U.S. Pat. No. 5,774,115

There are various arrangements known in the prior art to removably secure such controller devices to a touch screen, computer display, or a superstrate placed over either of these devices. One object of the present invention is to use magnetic assemblies to adhere controller devices to flat panel displays, with or without the combined use of touch screen devices. A further object of the invention is the use of a linear magnetic drive in a fader controller to translate the fader cap under machine control, whereby automatic fader controllers may be applied to flat panel displays, touch screens, and computer displays in general.

BRIEF SUMMARY OF THE INVENTION

The present invention generally comprises moveable magnetic devices for use in conjunction with electronic displays associated with computers and electronic devices. In particular, the invention enables manual input devices and control devices to be joined to an electronic display, whereby the computer or electronic device may be controlled, inputs may be made thereto, and the electronic display may be altered in correspondence to these inputs.

In one aspect, the invention includes a fader controller comprised of a longitudinally extending track having at least a portion thereof extending over an image area of an electronic display. A fader cap is joined to the track for longitudinal sliding translation therealong, the variable position of the fader cap corresponding to a selected input value or to a control function. The cap may be moved manually along the track to change the input value or control function. The display output may be altered by the computer or electronic appliance in response to the input/control function to comprise an interactive graphical user interface.

A salient feature of the fader controller is a mechanism for driving the fader cap to any position along the track. The mechanism includes a plurality of permanent magnets spaced along the track and arranged with opposite poles in close proximity. The fader cap is provided with at least one electromagnet having poles that are longitudinally opposed. A plurality of conductive rails extend longitudinally on the track, and the fader cap includes contacts that electrically engage the conductive rails. Some of the fader cap contacts are connected to the electromagnet(s), and at least one track interacts with one contact on the fader cap to detect the instantaneous position of the fader cap.

The power rails are selectively driven with a voltage that alternates in accordance with the fader cap position, so that the electromagnet poles interact with the permanent track magnets to translate the fader cap distally or proximally along the track. The fader cap thus may be driven automatically to any desired position along the track, whereby the computer or electronic appliance may place the fader cap any preset position. The conductive rail associated with position sensing may include a distributed resistance therealong, whereby changes in voltage on the position sensing rail may be correlated with the linear position of the fader cap.

In a further embodiment of the fader controller, the number of conductive rails may be reduced to two, comprised of a DC/common rail and a resistive, position sensing rail. The fader cap includes a touch sensor circuit and a processor to drive alternately each of two electromagnets in the cap, and one of the rails includes a distributed resistance that enables the system to determine the instantaneous position of the fader cap.

In another aspect, the invention provides a magnetic arrangement for joining one or more controller device to a flat panel electronic display, whereby controllers such as switches, knobs, and faders (slide controllers) may be superposed on the display. The controllers may be connected to the computer or electronic appliance that is associated with the display to enable input functions and control functions to be carried out. The flat panel display output may be altered by the computer or electronic appliance in response to the input/control function to comprise an interactive graphical user interface.

The magnetic arrangement includes, in one aspect, a pair of tracks mounted adjacent to the rear surface of a flat panel display, the tracks disposed at the side and end margins of the display. A pair of bars are slidably secured to the side tracks and end tracks, respectively, each bar spanning the rear surface of the display, and a magnet or electromagnet is secured at the intersection of the pair of bars. The bars may be translated along their respective tracks to selectively position the electromagnet at any location that corresponds to a desired location on the front surface of the flat panel display. The controller device includes a magnet (permanent or electromagnet) that is attracted to the rear electromagnet, whereby the controller is secured to the flat panel display. The controller may comprise any of the controller devices disclosed in the prior art, such as the patent application referenced above, or exemplified in the patents referenced above.

As a variant of this approach, a single pair of tracks may be provided at either the sides or end of the rear surface of the display, and a bar may be slidably secured to the pair of tracks. A magnet or electromagnet is slidably secured to the bar, and translation of the bar along the track combined with translation of the electromagnet along the bar enable the positioning of the electromagnet at any selected location corresponding to a desired placement of a controller device on the front surface of the display. This arrangement may be compounded by the provision of a plurality of slidable bars in adjacent relationship, each supporting at least one electromagnet to function as described above.

In a further aspect, the magnetic arrangement includes an extendable, rotatable arm secured adjacent to the rear surface of a flat panel display. The arm includes a proximal end secured at one corner of the display, and a distal end which supports an electromagnet or magnet. As before, a controller device at the front surface of the display includes a magnet (permanent or electromagnet) that is attracted to the rear electromagnet, whereby the controller is secured to the flat panel display. The arm may be rotated and extended manually, or by motors and/or linear actuators. As an alternative to the rotatable arm arrangement, a multi-segment, hinged arm may be secured at the rear surface and articulated by manual or motor means to position the electromagnet to correspond to the desired placement of a controller on the front surface of the display.

DETAILED DESCRIPTION OF THE INVENTION

The present invention generally comprises moveable magnetic devices for use in conjunction with electronic displays associated with computers and electronic devices. With regard to FIGS. 1 and 2, one moveable magnetic device comprises a fader controller 21 that embodies the capability to be automatically moved to a preset value or predetermined position. The fader controller 21 includes a track 22 extending longitudinally and having a base surface 23 that is adapted to be secured to an electronic graphic display, such as a flat panel display, VDT, or the like. The track is provided with a T-shaped cross section, with the base surface 23 comprising the lower surface of the stem of the T section. (A fader cap 24 is secured to the track 22 for free sliding translation therealong. The fader cap 24 includes low friction bearing surfaces that engage the upper, lower, and side surfaces of the upper portion of the T shape of the track to enable free translation. Other track cross-section configurations are possible, with concomitant modifications of the fader cap to engage the track in freely sliding fashion. The cap 24 may be provided with a dished upper surface 26 configured to accept a fingertip touch, so that the cap may be moved manually along the track to any desired position.

Figure 1:
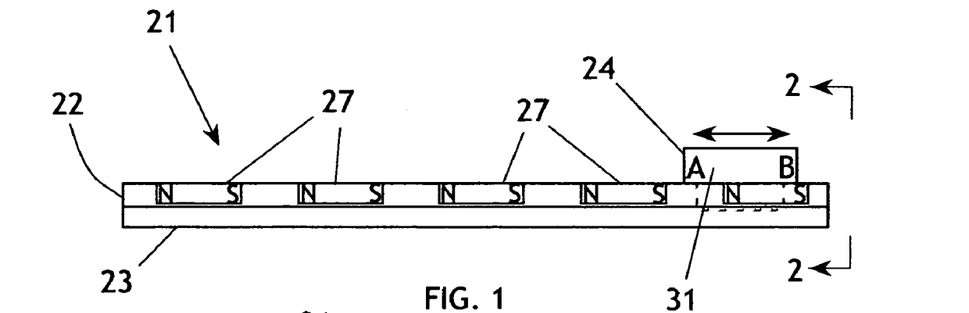
FIG. 1 is a side elevation of a fader controller having a linear drive for moving the fader cap along the fader track.
Figures 2, 3:
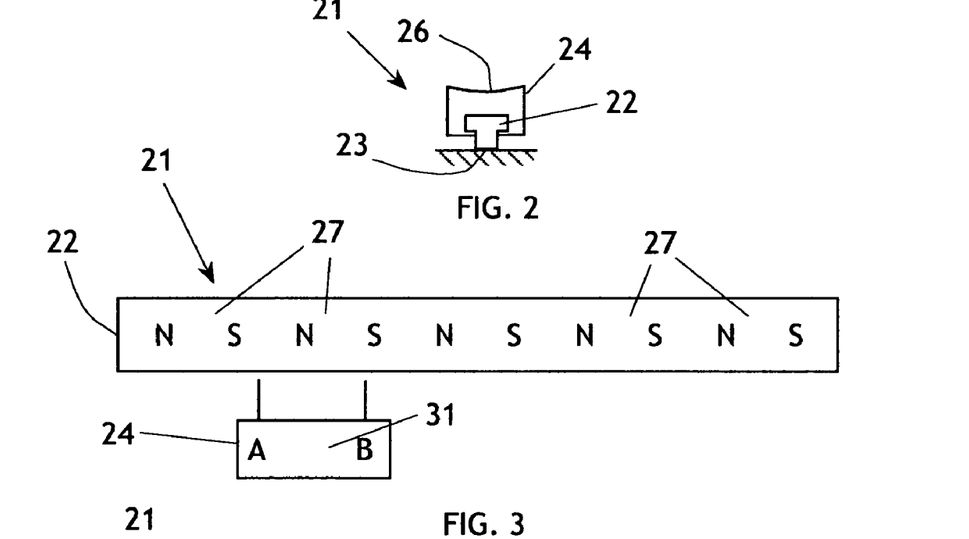
FIG. 2 is an end elevation of the fader controller, taken along line 2—2 of FIG. 1.
FIG. 3 is a functional block diagram depicting one arrangement of magnets for the linear drive fader controller of FIG. 1.

Secured with the track 22 is a plurality of permanent magnets 27. The magnets 27 are arrayed with their north/south polar axes in alignment with the longitudinal extent of the track, and with confronting ends of the magnets having opposite polarity. The magnets 27 are disposed closely adjacent to the upper surface of the track 22, so that the magnetic fields intersect the fader cap to a maximum extent.

Figure 4:
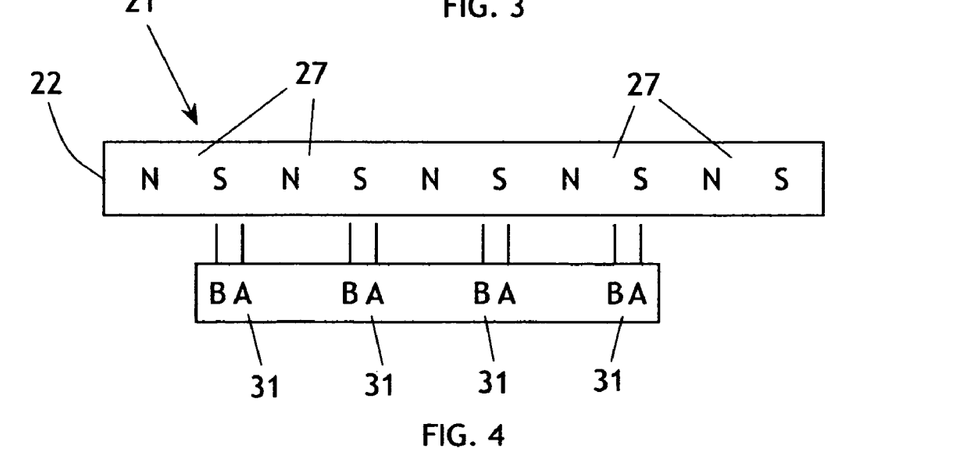
FIG. 4 is a functional block diagram depicting another arrangement of magnets for the linear drive fader controller of FIG. 1.

Disposed within the fader cap is at least one pair 31 of electromagnets, depicted with poles A and B spaced apart along a longitudinal axis. The electromagnet(s) is arranged to be selectively driven to reverse polarity, whereby the poles A and B of the electromagnet 31 will interact with the permanent magnets 27 in the track 22 and generate longitudinal force that drives the fader cap 24 to translate along the track. Alternatively, as shown in FIG. 4, a plurality of electromagnets 31 may be disposed in the fader cap with a longitudinal spacing that is similar to the spacing provided in the embodiment of FIG. 3.

Figure 7:
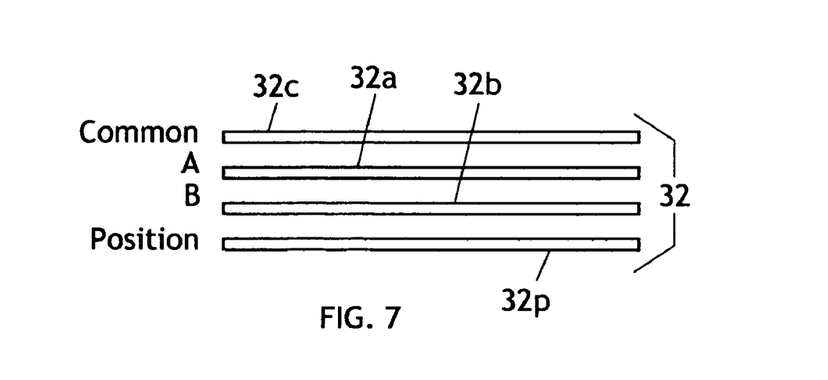
FIG. 7 is a schematic layout of the conductive rails extending along the track of the linear drive fader controller of FIGS. 1–4.

The track further includes a plurality of conductive rails 32, as shown in FIG. 7, that extend longitudinally along the track 22. The rails may be placed on any of the track surfaces that are engaged by the fader cap. The fader cap is provided with a plurality of brushes or contacts that are disposed to extend to and electrically engage the conductive rails 32. In this embodiment, the rails 32a and 32b are connected, respectively, to A and B current supplies, rail 32c is connected to Common (ground), and rail 32p is a Position rail, which may comprise a distributed resistance or other similar property for use in a subsystem for determining the position of the fader cap 24 along the track 22.

Figure 8A:
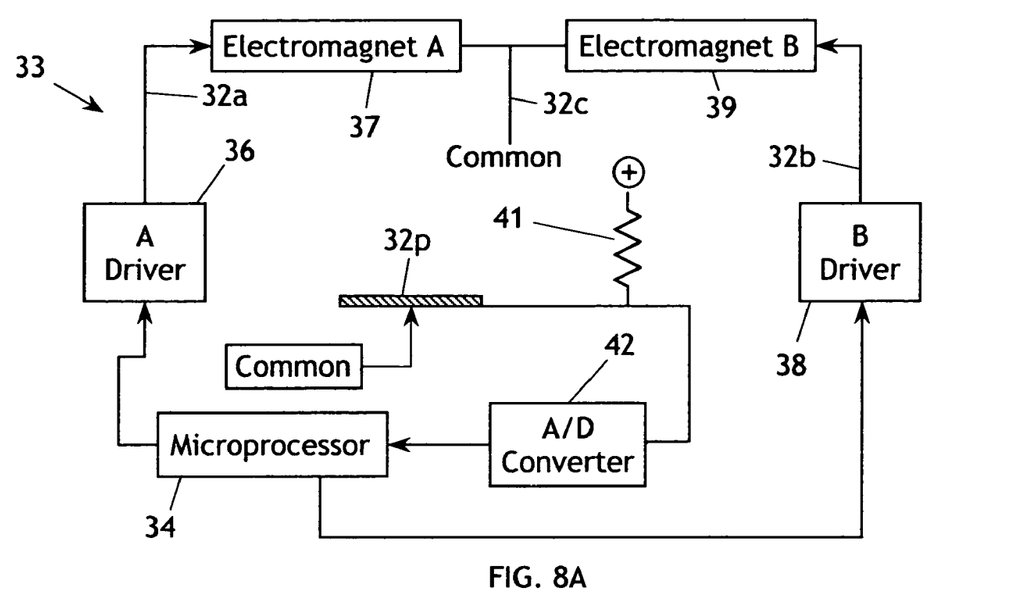
FIGS. 8A and 8B are schematic views of the electronic circuit for operating the linear drive mechanism of the embodiment of FIGS. 1–4.

With regard to FIG. 8A, the invention includes a driver circuit 33 for operating the electromagnet 31 to translate the fader cap. The circuit 33 includes a microprocessor 34 programmed appropriately to receive inputs and produce outputs as described herein. The microprocessor is connected to actuate driver 36, which is connected through rail 32a to electromagnet 37, and also connected to actuate driver 38 which is connected through rail 32b to electromagnet 39. Both electromagnets are connected to common through rail 32c. Either driver 36 or 38 is driven alternately to switch the polarity of the magnets 37 and 39. It may be appreciated that the electromagnets may comprise a single unit that is driven selectively to reversible polarity by the circuit 33. In addition, the position track 32p is connected to common to form a variable resistance determined by the position of the fader cap along the track. The variable resistance is connected in parallel with a fixed resistance 41, the parallel combination being connected through an A/D converter 42 to the microprocessor 34, which correlates the digital resistance signal from converter 42 with fader cap position, either by use of a lookup table or a subroutine that calculates position from resistance level. The circuit 33 may be embodied within the fader cap itself, or may be disposed at the margin or periphery of a display of a computer or electronic appliance to which the fader controller 21 is connected. Alternatively, the circuit 33 may be embodied in the computer system which controls such a display.

Figure 5:
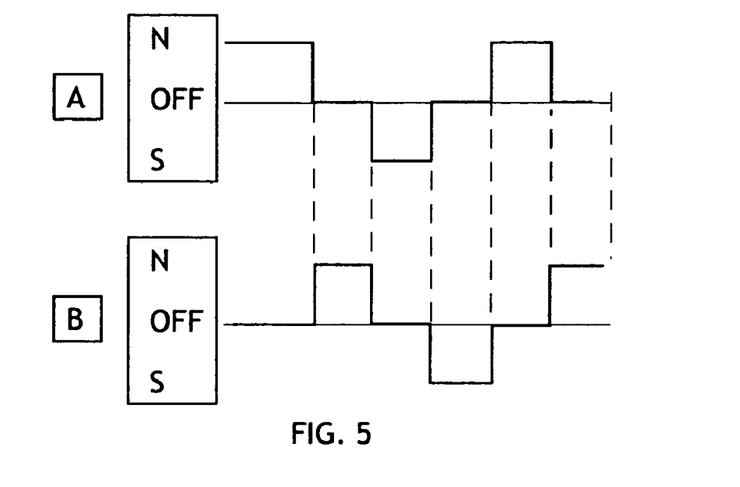
FIG. 5 is a graphic depiction of the electromagnet polarity timing required to translate the fader cap from left to right as depicted in FIGS. 1, 3, and 4.
Figure 6:
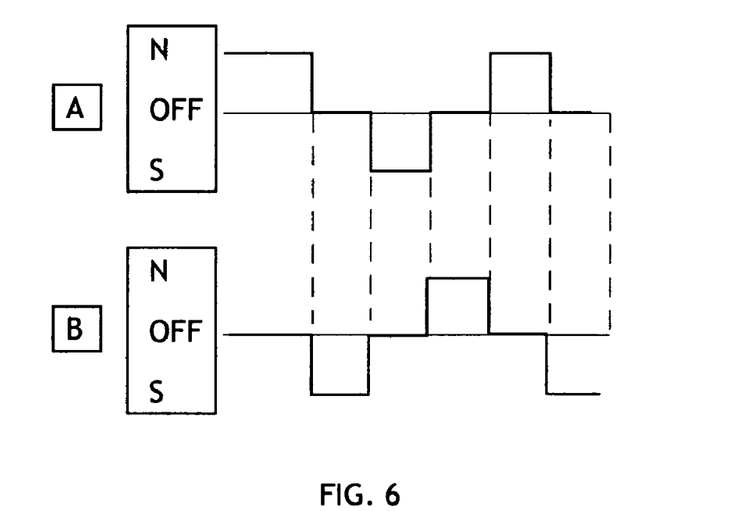
FIG. 6 is a graphic depiction of the electromagnet polarity timing required to translate the fader cap from right to left as depicted in FIGS. 1, 3, and 4.

With regard to FIG. 5, there is shown the sequence for actuating the polarity of electromagnets A and B in north, south, or off polarity to translate the fader cap from right to left as depicted in FIGS. 1–4. Likewise the chart of FIG. 6 shows the sequence actuating the polarity of electromagnets A and B in north, south, or off polarity to translate the fader cap from left to right. These sequences are also applicable for the multiple electromagnet embodiment of FIG. 3. It may be appreciated that the computer or electronic appliance to which the circuit of FIG. 8 is connected may selectively actuate the fader cap linear drive to translate the fader cap 24 to any desired position or preset value along the track 22. Likewise, the graphic presentation on the display associated with the fader controller 21 may be changed to indicate (numerically or graphically) the instantaneous position of the fader cap 24 and the position or value associated therewith.

Figure 8B:
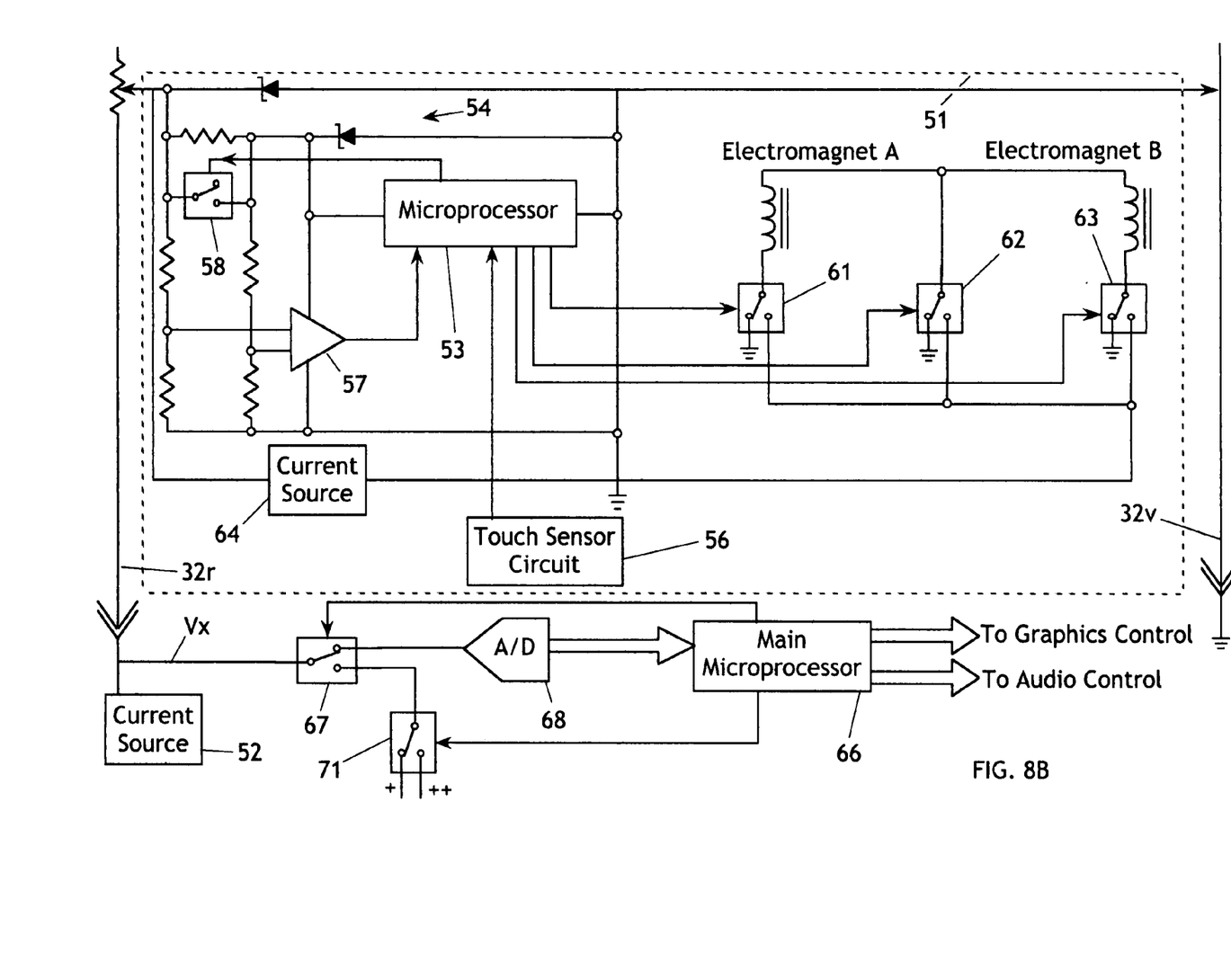

With reference to FIG. 8B, the fader controller 21 may includes only two conductive rails 32r and 32v, a reduction in number from the four rails described previously. This embodiment may have particular utility in fabricating small models of the invention, wherein the width of the track 22 is rather narrow. Conductive rail 32r is connected to a current source 52, and includes a distributed resistance to serve as a position indicator. Rail 32v is connected to common or ground. An onboard circuit 51 is mounted within the fader cap 22, and is connected between the rails 32r and 32v to receive power therefrom. The circuit is arranged to move the fader cap to any selected position along the track, and to permit manual movement of the fader cap 22 to any desired position.

The circuit 51 includes a microprocessor 53 connected to a zener regulated power supply 54 to receive a constant operating voltage. A touch sensor circuit 56 is provided in the top surface of the fader cap 24, and includes a signal line connected to an input of the microprocessor 53 to conduct a touch signal thereto. Another microprocessor input is formed by the output of voltage comparator 57, which has inputs connected across a resistor network that is spanned by switch 58. A trio of single throw, double pole switches 61, 62, and 63 are connected to electromagnet A, Common, and electromagnet B, respectively, and the switches are normally closed to ground. Each switch 61–63 has a normally open pole connected to current source 64, and an input triggers of switches 58 and 61–63 are connected to respective outputs of the microprocessor 53, whereby they are individually, selectively actuated.

Whenever the touch sensor circuit 56 is activated by fingertip touch, and the touch is then removed, the circuit 56 signals the microprocessor 53. The microprocessor 53 in turn actuates switch 58 for a short period; e.g., 1 msec. Switch 58 when closed shorts across its parallel resistor, and causes a momentary drop in the voltage on rail 32r. This signal pulse appears at Vx; which is passed by normally closed contacts of switch 67 to A/D converter 68 and thence to main microprocessor 66, which in turn controls the electronic graphics display and associated audio control. Thus the computer or electronic appliance is signaled whenever the fader cap 24 is touched.

It is noted that when the fader cap 24 is disposed in its most proximal disposition, typically withdrawn to or beyond the margin of an electronic graphic display, the resistance value of the distributed resistance in rail 32r is substantially zero. The voltage Vx is thus a maximum, generally equal to the voltage across the zener diode connected between supply and ground. When the fader cap 24 is disposed at its most distal position, typically extended into the image area of an electronic graphic display, the value of the distributed resistance is maximum (on the order of 10 ohms), and the voltage Vx drops to a known minimum level. Between these maximum and minimum levels, it is clear that the steady state of voltage Vx is directly indicative of the position of the fader cap 24 along the track. Thus the main microprocessor 66 may determine the position of the fader cap at any instant.

The main microprocessor 66 may also send data and commands to the fader cap microprocessor 53. The microprocessor 66 may command the switch 67 to close, connecting the normally open contact to single pole, double throw switch 71. Switch 71 is actuated by the microprocessor 66, with the switch poles connected to differing plus voltage levels (such as 4vdc and 5 vdc). The switch 71 may be toggled selectively to generate a pulse train of low-going pulses on the rail 32r. These low going pulses appear across voltage comparator 57, which responds by generating a data packet signal that is fed to the microprocessor 53. Thus the main microprocessor may determine the fader cap position and receive touch signals therefrom, and may also send data and commands to the fader cap.

Figure 9:
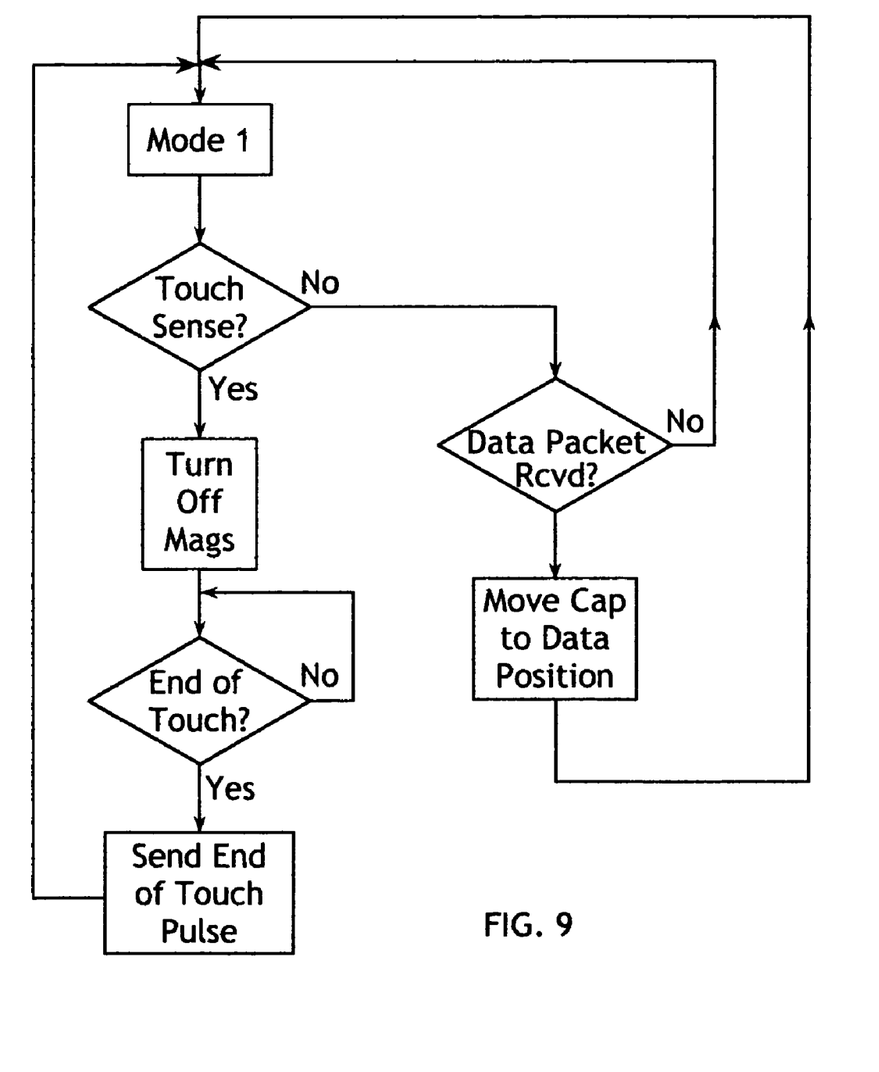
FIG. 9 is a flow chart depicting the general operation of the fader cap microprocessor of the circuit of FIG. 8.

With reference to FIG. 9, the functional flow chart for the microprocessor 53 begins at Mode 1, and it first determines if there is a touch sense signal. If so, the microprocessor 53 deactivates switches 61–63 to turn off the electromagnets A and B. At the end of touch signal, the microprocessor sends an end of touch pulse to the main microprocessor 66, as described above, and returns to Mode 1. If there is no touch signal received, the system looks for a data packed received from the main microprocessor 66 (by a process described above). The data packet may include such items as a new desired position, the number of pulses that must be fed to the electromagnets to move to the new position, the speed at which the cap is to move, and the direction the cap is to move. If there is a data packet, the system generates commands to move the cap in accordance with the data packet. If no data packet has been received, the system returns to Mode 1 and begins a new loop excursion.

Figure 10:
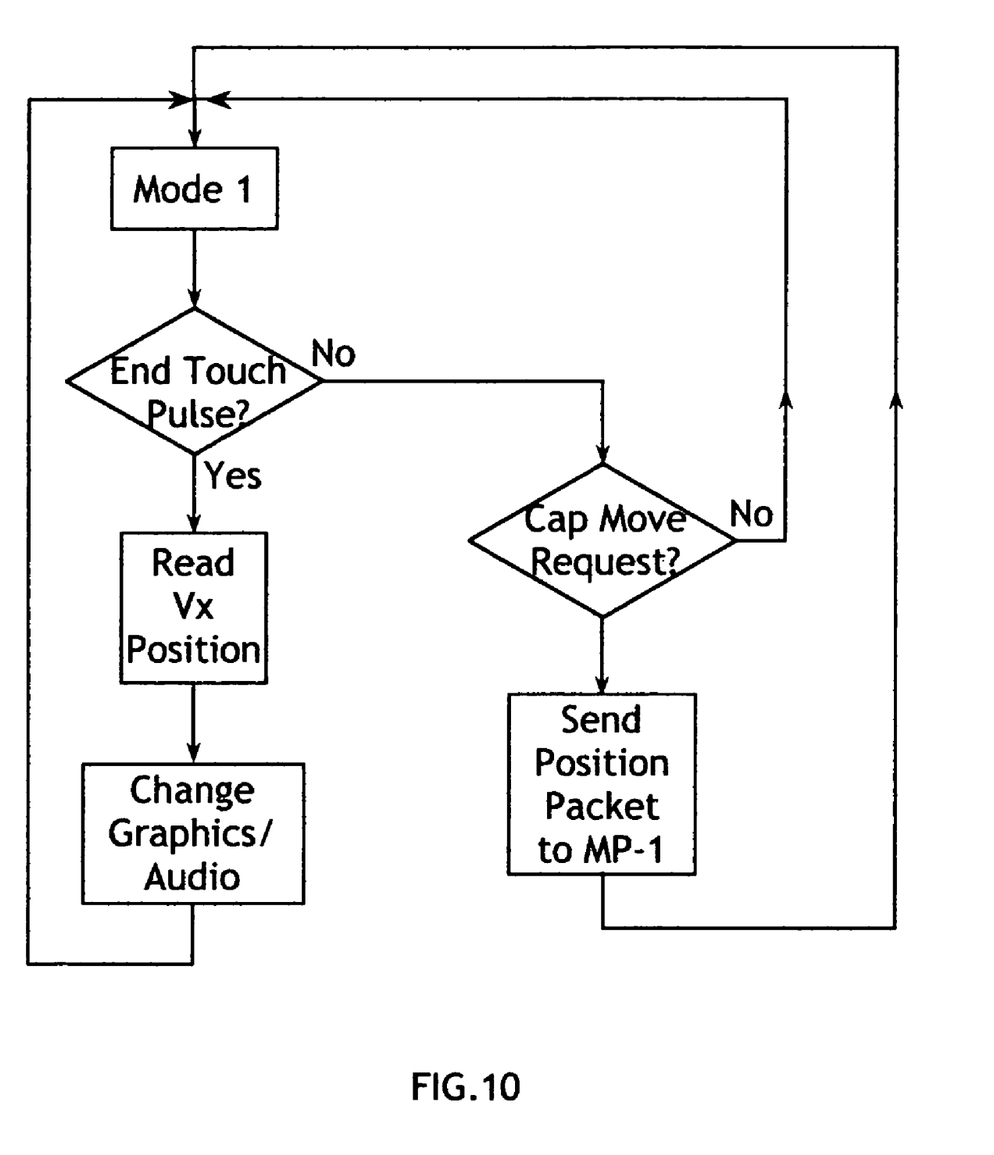
FIG. 10 is a flow chart depicting the general operation of the main microprocessor of the circuit of FIG. 8.

With reference to FIG. 10, the functional flow chart for the microprocessor 66 begins at Mode 1, and it first determines if there is an end of touch signal transmitted from the fader cap circuit, as described above. If so, the microprocessor 66 reads the voltage Vx to determine the cap position along the track 22, and it changes the electronic display graphics and audio control in accordance with the new cap position. If there is no end of touch pulse, the system looks for a cap move request. If there is a cap move request, the system sends a data packet to microprocessor 53, which then carries out the instructions as shown in FIG. 9. If there is no cap move request, the flow chart returns to Mode 1 and reiterates.

Thus manual positioning of the fader cap is recognized by the system as a command to change a control input and its associated graphic representation on the electronic display. The system may also move the fader cap under machine control to a preset or predetermined position and associated control input value. This latter function is very useful; e.g., in a situation in which a plurality of inputs are involved, and it is desirable to establish a previous arrangement of control levels.

There are other equivalent means and methods for carrying out some of the functions described with respect to the embodiments of FIGS. 1–10. For example, data packets may be exchanged between the fader cap circuit 51 and the computer or electronic appliance by low power radio signal, optical signal, or the like. In addition, if the device used in conjunction with a touch screen device, the position of the fader cap may be determined by a touch signal generated by the fader cap circuit and/or provoked by a touch stylus extending from the fader cap. Furthermore, photovoltaic cells may be disposed in the fader cap to receive light from the electronic display, whereby not only operating power for the fader cap circuit may be provided, but also position sensing graphical data may be supplied to the fader cap. Likewise, the fader cap circuit may be provided with a battery power supply. Thus there are various arrangements, including those shown in the US patents referenced above and in the parent application referenced above, that may obviate the need for some or all of the conductive rails described herein for powering the fader cap and transmitting position information and movement commands. And, despite the seeming complexity of these embodiments described thus far, they may be produced as small format, crack-and-peel assemblies (described in the parent application) that are inexpensive and easily placed on or removed from an electronic display, touch screen, superstrate, or the like.

Figure 11:
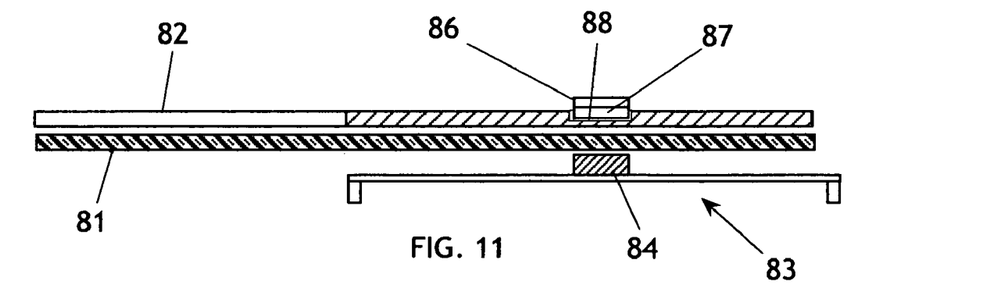
FIG. 11 is a cross-sectional side elevation depicting a further embodiment of the invention, in which a controller is secured to a display using a magnet behind the display.
Figure 12:
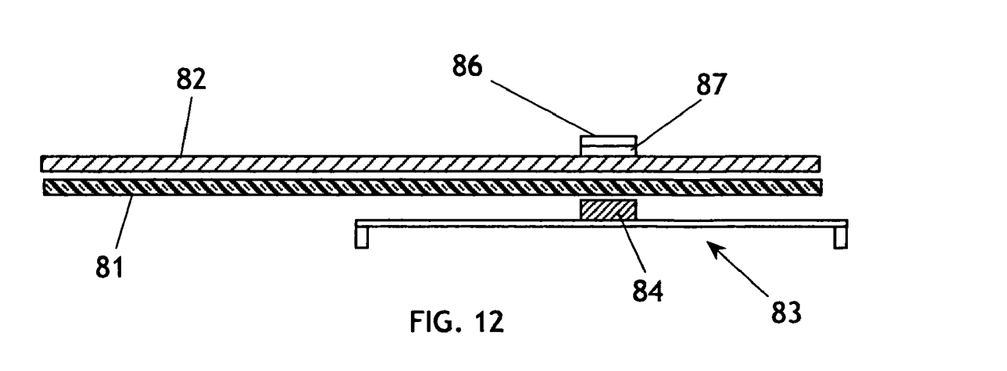
FIG. 12 is a cross-sectional side elevation depicting another embodiment of the invention, in which a controller is secured to a display using a magnet behind the display.

In a further aspect of the invention, the track structure 22 on the display, touch screen, or superstrate may be eliminated. With regard to FIGS. 11 and 12, a flat panel display 81 is provided with a cover glass or superstrate 82. Disposed below the display 81 is a structural assembly 83 that supports a magnet 84. The magnet 84 may be permanent or electromagnetic, and is mounted for sliding translation on the assembly 83. Disposed at the outer surface of the superstrate 82 (or at the outer surface of the display 81, if no superstrate is provided) is a fader cap controller 86 which includes a magnet 87 (permanent or electromagnetic) that engages the magnet 83 with sufficient force to retain the fader cap controller 86 at the outer surface of the display/superstrate assembly. In the embodiment of FIG. 11, the fader cap controller is received in a channel-like groove in smoothly sliding fashion, whereby translation of the cap is guided in a linear direction. In the embodiment of FIG. 12, the fader cap 86 is slidably received on the surface of the superstrate or flat panel display, and is guided manually in accordance with a graphic presentation on the flat panel display. In either case, the magnet 84 is adapted to undergo translation in concert with the fader cap 86, so that adhesion to the display assembly is maintained. The sliding surface of the cap 86 may comprise a polished material such as metal or glass, a lubricious substance such as Teflon, or a cushioning material such as felt or any other material that slides easily over the front surface of the display assembly.

Figure 13:
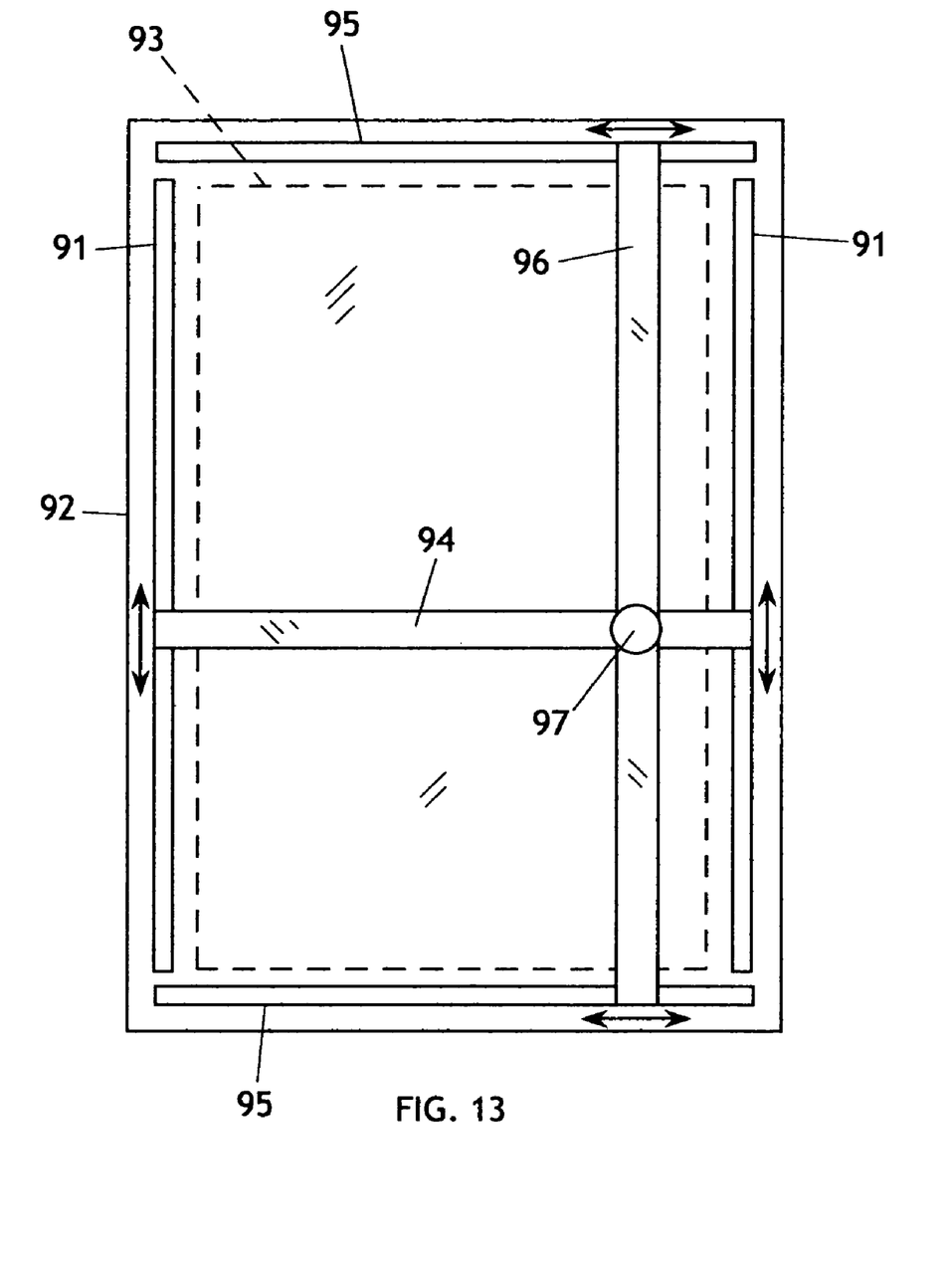
FIG. 13 is a rear elevation depicting two orthogonally related pairs of rails for movably supporting a magnet to retain a controller on the front surface of a display.

With regard to FIG. 13, one embodiment of the structural assembly 83 includes a pair of rails 91 secured to the rear surface of a flat panel display 92 and spaced apart to be outside the side margins of the image area 93 of the display 92. Another pair of rails 93 are secured to the rear surface of the display 92 outside the end margins of the image area 93. A bar 94 is slidably mounted on the rails 91, and another bar 96 is slidably mounted on the rails 95. At the intersection of the bars 94 and 96 a magnet 97 (electromagnet or permanent magnet) is secured. The bars 94 and 96 may be fabricated of transparent material, particularly for back-lighted displays. Translation of the bars 94 and 96 in rectilinear format is carried out to position the magnet 97 at any desired location behind the display, corresponding to any desire location of a magnetically adhered controller device on the front surface of the display assembly. In addition, the position of the magnet 97 may move in concert with the movement of the controller at the front surface, under control of the microprocessor that operates the display assembly and associated computer or electronic appliance.

Figure 14:
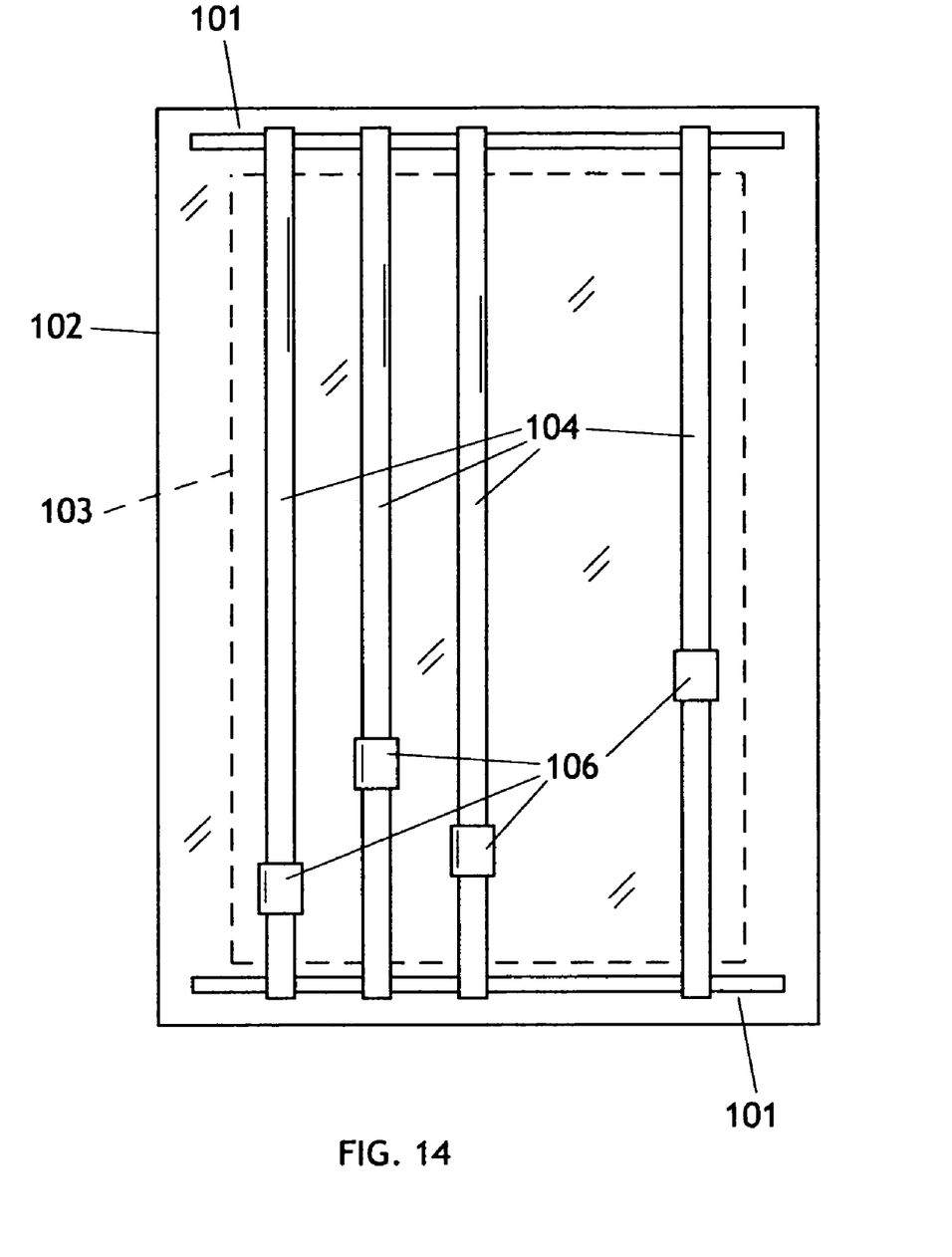
FIG. 14 is a rear elevation depicting a plurality of vertical rails for supporting magnets that adhere controllers to the front surface of a display.

In a further embodiment of the invention, shown in FIG. 14, a pair of rails 101 are secured to the rear surface of a flat panel display 102 outside the end margins of the image area 103. At least one, and preferably a plurality of bars 104 are slidably mounted on the rails 101, spanning the image area 103 and each supporting a magnet 106 (electromagnet or permanent magnet). Each magnet 106 is individually translatable along its respective bar 104, whereby a plurality of magnets 106 may be arrayed behind the display to support a like plurality of magnetically adhered controller devices throughout the image area 103. Each bar 104 may be translated along the rails 101 under machine control, and each magnet 106 may be translated under machine control along its respective bar 104. Thus, for example, a plurality of fader cap controllers (or knob controllers described in related patents and applications) capable of magnetic adhesion may be placed or scattered on the front surface of the display 102, and adhered to respective magnets 106. Changes in positions of the fader cap controllers are detected by the microprocessor that operates the display and its associated computer or electronic appliance, and the positions of magnets 106 may be changed in concert to maintain magnetic adhesion. Translation of bars and magnets may be carried out using linear actuators, motor drives for pulley or rack and pinion arrangements, or any other mechanisms known in the prior art for such purposes.

Figure 15:
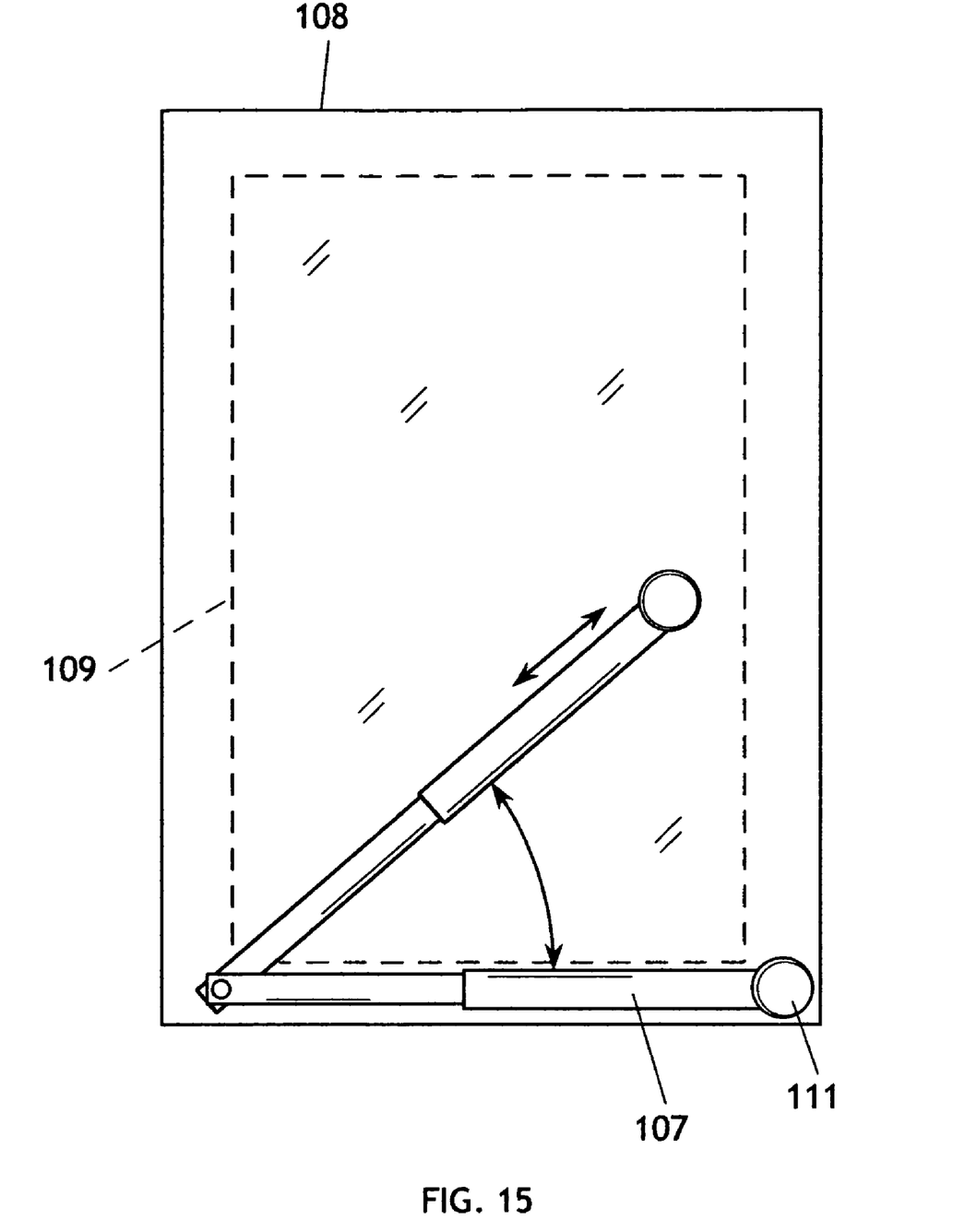
FIG. 15 is a rear elevation depicting a pivoting, extendable arm for supporting a movable magnet that adheres a controller to the front surface of a display.

With regard to FIG. 15, a further embodiment of the invention includes an arm 107 mounted on the rear surface of a flat panel display 108, the arm mount enabling rotation of the arm within an angular range that circumscribes the image area 109 of the flat panel display. The arm is telescoping (extendable) and rotatable under machine control, as is commonly found in the art of robotics and related fields. At the distal end of the arm 107 is a magnet 111 (electromagnet or permanent magnet) that is capable of securing a controller device capable of magnetic adhesion to the front surface of the display assembly. The arm 107 may be rotated and extended to place the magnet 111 at any desired position in the image area 109 to secure a controller device thereat, and may be moved in concert with the controller (in the case of a fader cap controller) or may secure the controller device at a fixed location (as in the case of a knob controller).

Figure 16:
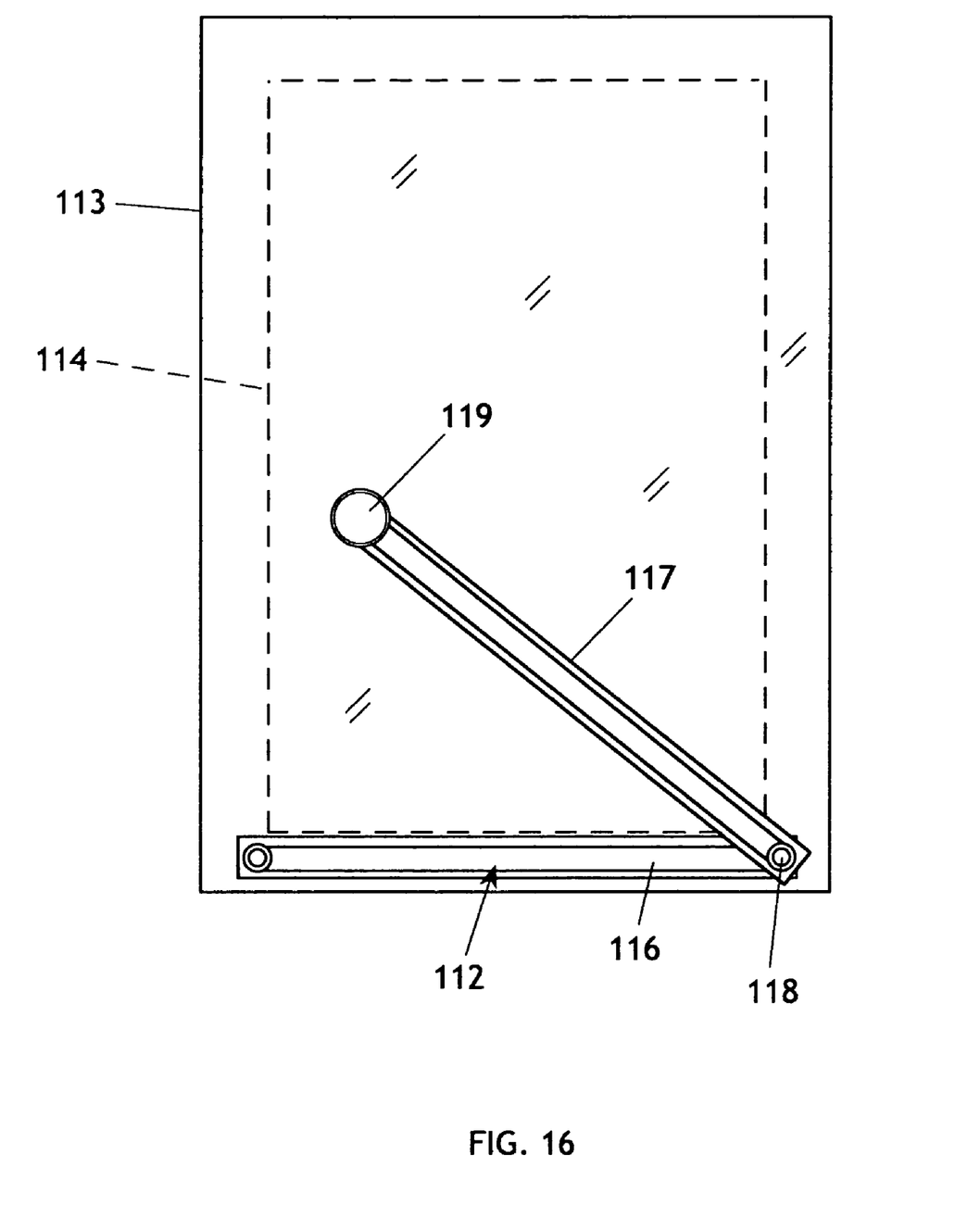
FIG. 16 is a rear elevation depicting a pivoting, multiple segment articulated arm assembly for supporting a movable magnet that adheres a controller to the front surface of a display.

A further variant of this concept, shown in FIG. 16, includes an arm assembly 112 secured to the rear surface of the display 113 outside of the image area 114 thereof. The arm assembly includes at least two segments 116 and 117 that are hinged at pivot 118. A magnet 119 is supported at the distal end of the arm assembly 112, and is adapted to magnetically adhere a controller device to the front surface of the display 113. The segments 116 and 117 may be articulated using pulley and cable mechanisms, or direct drive motors at the pivot points, or other mechanisms known in the prior art. As before, the arm 112 may be rotated and extended to place the magnet 119 at any desired position in the image area 114 to secure a controller device thereat, and may be moved in concert with the controller (in the case of a fader cap controller) or may secure the controller device at a fixed location (as in the case of a knob controller).

With regard to the embodiments of FIGS. 11–16, it may be appreciated that the control device secured to the front surface includes a magnetic member that may comprise a mass of ferromagnetic material, a permanent magnet, or an electromagnet, any of which may be configured or polarized to optimize engagement with the magnetic device disposed at the rear surface of the flat panel display.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A control apparatus for an electronic device having an electronic flat panel display, including:
   a removable control device adapted to engage a front surface of said electronic flat panel display, said control device being connected to said electronic device for interactive operation therewith and including a first magnetic member;
   a second magnetic member disposed at a rear surface of said flat panel display, said second magnetic member attracting said first magnetic member and magnetically adhering said control device in selectively releasable fashion to said front surface of said flat panel display; and,
   means for permitting translation of said removable control device in the plane of said front surface of said electronic flat panel display.

2. The control apparatus of claim 1, wherein said means for permitting movement includes means for supporting said second magnetic member in movable fashion, corresponding to said translation of said removable control device, at said rear surface of said flat panel display.

3. The control apparatus of claim 2, wherein said means for permitting movement includes a channel-like groove formed in said front surface of said flat panel display, said control device being received in said groove in freely sliding translation.

4. The control apparatus of claim 3, wherein said removable control device comprises a fader cap slidably received in said groove, the longitudinal position of said fader cap in said groove corresponding to a variable control input of said electronic device.

5. The control apparatus of claim 2, wherein said means for supporting includes an articulated arm assembly secured adjacent to said rear surface of said flat panel display, said second magnetic member being secured to a distal end of said articulated arm assembly.

6. The control apparatus of claim 5, wherein said flat panel display is operatively connected to an electronic apparatus capable of driving said display to present graphic output.

7. The control apparatus of claim 6, wherein said electronic apparatus includes means for tracking changing position of said removable control device on said front surface of said flat panel display, and means for moving said articulated arm assembly in concert with said changing position of said control device, whereby said second magnetic member maintains magnetic traction with said first magnetic member.

8. The control apparatus of claim 5, wherein said articulated arm assembly includes a telescoping arm, and a pivoting mount for securing a proximal end of said telescoping arm adjacent to said rear surface of said flat panel display.

9. The control apparatus of claim 5, wherein said articulated arm assembly includes a multi-segment assembly having pivoting joints joining adjacent ends of each segment, said second magnetic member being secured to a distal end of said multi-segment assembly.

10. The control apparatus of claim 2, wherein said means for supporting said second magnetic member includes a bar spanning a portion of said rear surface of said flat panel display, said second magnetic means supported on said bar, and means for translating said bar across said rear surface.

11. The control apparatus of claim 10, wherein said means for translating includes at least one pair of guide rails secured at said rear surface of said flat panel display, said bar being translatably secured between said guide rails.

12. The control apparatus of claim 11, wherein said flat panel display is operatively connected to an electronic apparatus capable of driving said display to present graphic output.

13. The control apparatus of claim 12, wherein said electronic apparatus includes means for tracking changing position of said control device on said front surface of said flat panel display, and means for moving said bar in concert with said changing position of said control device, whereby said second magnetic member maintains magnetic traction with said first magnetic member.

14. The control apparatus of claim 13, wherein said second magnetic means is further movable along the length of said bar.

15. The control apparatus of claim 14, further including a plurality of said bars supported on said guide rails, and a plurality of said second magnetic members, each supported on one of said plurality of said bars.

16. A control apparatus for an electronic device having a flat panel display, including:
- a plurality of removable control devices, each adapted to slidably engage a front surface of said flat panel display, said control devices each including a first magnetic member;
- a plurality of second magnetic members, each disposed at a rear surface of said flat panel display, each of said second magnetic members attracting a respective one of said first magnetic members and magnetically adhering a respective one of said control devices to said front surface of said flat panel display in selectively releasable fashion.

17. The control apparatus of claim 16, further including means for tracking changing positions of said control devices on said front surface of said flat panel display, and means for moving said second magnetic members in concert with said changing positions of said control devices, whereby said second magnetic members maintain magnetic traction with said first magnetic members.

18. The control apparatus of claim 17, wherein said first magnetic members comprise fader caps.

* * * * *